United States Patent
Balakrishna et al.

(10) Patent No.: US 11,030,349 B2
(45) Date of Patent: *Jun. 8, 2021

(54) SECURE DATA DISPLAY

(71) Applicant: International Business Machines Corporation, Armonk, NY (US)

(72) Inventors: Vijaya Balakrishna, Austin, TX (US); Ambal Balakrishnan, Austin, TX (US); Brian Clarke, Austin, TX (US); Andrew R. Jones, Round Rock, TX (US); Linda Zimmer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/171,981

(22) Filed: Oct. 26, 2018

(65) Prior Publication Data
US 2020/0134238 A1 Apr. 30, 2020

(51) Int. Cl.
*G06F 21/00* (2013.01)
*G06F 21/84* (2013.01)
*H04W 4/80* (2018.01)
*G06F 21/60* (2013.01)
*G09G 5/14* (2006.01)
*G06F 3/0354* (2013.01)

(52) U.S. Cl.
CPC ............ *G06F 21/84* (2013.01); *G06F 21/604* (2013.01); *G09G 5/14* (2013.01); *H04W 4/80* (2018.02); *G06F 3/03545* (2013.01); *G09G 2354/00* (2013.01); *G09G 2358/00* (2013.01)

(58) Field of Classification Search
CPC .... G06F 21/84; G06F 21/604; G06F 3/03545; H04W 4/80; G09G 5/14; G09G 2358/00; G09G 2354/00
See application file for complete search history.

(56) References Cited

U.S. PATENT DOCUMENTS

| 5,107,443 A | 4/1992 | Smith et al. |
| 5,748,763 A * | 5/1998 | Rhoads ............... H04N 1/32144 382/115 |
| 7,669,051 B2 | 2/2010 | Redlich et al. |

(Continued)

OTHER PUBLICATIONS

IBM: List of IBM Patents or Patent Applications Treated as Related (Appendix P), Jan. 20, 2020, pp. 1-2.

(Continued)

*Primary Examiner* — Mahfuzur Rahman
(74) *Attorney, Agent, or Firm* — Robert C. Bunker

(57) ABSTRACT

The method, computer program product and computer system may include computing device which may detect a first user within a defined area of a display device and the first user may have a first security level. The computing device may display data on the display device and the data may be associated with a security parameter defining a security level for viewing the data. The computing device may detect a second user within the defined area of the display device and the second user may have a second security level. The computing device may determine that the second security level of the second user does not meet the security parameter for viewing the data and redact the data in response to determining that the second user does not meet the security parameter for viewing the data.

10 Claims, 6 Drawing Sheets

(56) References Cited

U.S. PATENT DOCUMENTS

| | | | |
|---|---|---|---|
| 9,069,982 B2* | 6/2015 | Coles | G06F 21/6209 |
| 9,135,599 B2 | 9/2015 | Westerinen et al. | |
| 10,437,444 B2* | 10/2019 | Reicher | G16H 30/20 |
| 2007/0061399 A1 | 3/2007 | Schmieder et al. | |
| 2007/0252001 A1 | 11/2007 | Kail et al. | |
| 2009/0025063 A1 | 1/2009 | Thomas | |
| 2015/0047017 A1* | 2/2015 | Kim | G06F 21/36 726/19 |
| 2015/0074615 A1* | 3/2015 | Han | H04W 12/06 715/863 |
| 2017/0063793 A1 | 3/2017 | Galbreath | |
| 2017/0178234 A1* | 6/2017 | Jezek, Jr. | G06Q 40/04 |
| 2019/0377900 A1* | 12/2019 | Balzer | G06F 21/6254 |
| 2020/0042837 A1* | 2/2020 | Skinner | G06F 21/62 |
| 2020/0068025 A1* | 2/2020 | Duran | H04L 63/10 |
| 2020/0074156 A1* | 3/2020 | Janumpally | G06K 9/00255 |
| 2020/0097713 A1 | 3/2020 | Cramer | |
| 2020/0125902 A1* | 4/2020 | Couse | G06K 9/6256 |
| 2020/0193666 A1* | 6/2020 | Cinnamon | G06T 7/001 |

OTHER PUBLICATIONS

U.S. Appl. No. 16/514,084, entitled "Secure Data Display", filed Jul. 17, 2019, 40 Pages.

Gjaere et al., "Designing privacy-friendly digital whiteboards for mediation of clinical progress", BMC medical informatics and decision making 14.1, 2014, 33 pps., https://www.ncbi.nlm.nih.gov/pmc/articles/PMC4021250/.

Boselli et al., "An adaptive middleware to support context-aware knowledge sharing", Distributed Computing Systems Workshops, 2005, 25th IEEE International Conference on IEEE, 2005.

Dooley et al., "The Intelligent Classroom: Beyond Four Walls", Presented at the Intelligent Campus 2011 (iC'11), Nottingham, Jul. 26, 2011.

Standford et al,, "The nist smart space and meeting room projects: signals, acquisition annotation, and metrics", Acoustics, Speech, and Signal Processing, 2003, Proceedings (ICASSP'03), 2003 IEEE International Conference on vol. 4, IEEE, 2003.

Ramos et al., "Smart offices and intelligent decision rooms", Handbook of Ambient Intelligence and Smart Environments, Springer, Boston, MA 2010, pp. 851-880.

Marsa Maestre et al., "A hierarchical agent-based approach to security in smart offices", In: Proceedings of the First International Conference on Ubiquitous Computing (ICUC—2006).

"Open Text—Redact-It", Copyright 2018 OpenText Corp, 3 pps., http://opentext.com/what-we-do/products/enterprise-content-management/content-centric-applications/opentext-redact-it.

Sat-Anand et al., "Does there exist a physical/digital whiteboard that saves what you draw?", 2014, 6 pps., https://www.quora.com/Does-there-exist-a-physical-digital-whiteboard-that-saves-what-you-draw.

* cited by examiner

SECURE DATA DISPLAY

BACKGROUND

The present invention relates generally to a method, system, and computer program for a secure data display. More particularly, the present invention relates to a method, system, and computer program for securing data presented on a shared display device.

Whiteboards and other display devices remain a mainstay for teams to collaborate and present data. Users of whiteboards and other display devices may use the display devices to share sensitive or confidential data which may only be viewed by people with a requisite security clearance.

An interactive whiteboard is an interactive display that resembles a whiteboard. It may be a touchscreen computer. It may be a screen that receives an image from a projector that is controlled by a touchpad or keyboard. In addition, various other technologies are known for implementing an interactive whiteboard. These technologies include an infrared scan (IR touch) whiteboard, a resistive touch-based interactive whiteboard, and an electromagnetic pen-based interactive whiteboard. In the case of the infrared scan whiteboard, movement of the user's finger, pen, or other pointer over the image projected on the whiteboard is captured by its interference with an infrared light at the surface of the whiteboard. In the case of the resistive touch-based interactive whiteboard, position and movement of a finger contacting the surface is determined electrically. In the case of the electromagnetic pen-based interactive whiteboard, position and movement of a pen tip is determined based on an interaction with an array of wires embedded behind the board surface. Other technologies for implementing an interactive whiteboard are known.

The various technologies that enable data or other information to be rendered on an interactive whiteboard also provide the capability to erase or otherwise cause the information presented on a whiteboard to cease being rendered on the whiteboard.

BRIEF SUMMARY

An embodiment of the invention may include a method, computer program product and computer system for securing data on a display device. The method, computer program product and computer system may include computing device which may detect a first user within a defined area of a display device and the first user may have a first security level. The computing device may display data on the display device and the data may be associated with a security parameter defining a security level for viewing the data. The computing device may detect a second user within the defined area of the display device and the second user may have a second security level. The computing device may determine that the second security level of the second user does not meet the security parameter for viewing the data and redact the data in response to determining that the second user does not meet the security parameter for viewing the data.

BRIEF DESCRIPTION OF THE DRAWINGS

FIG. 1b illustrates example operating modules of the secure data display program of FIG. 1a;

DETAILED DESCRIPTION

Figure 1A:
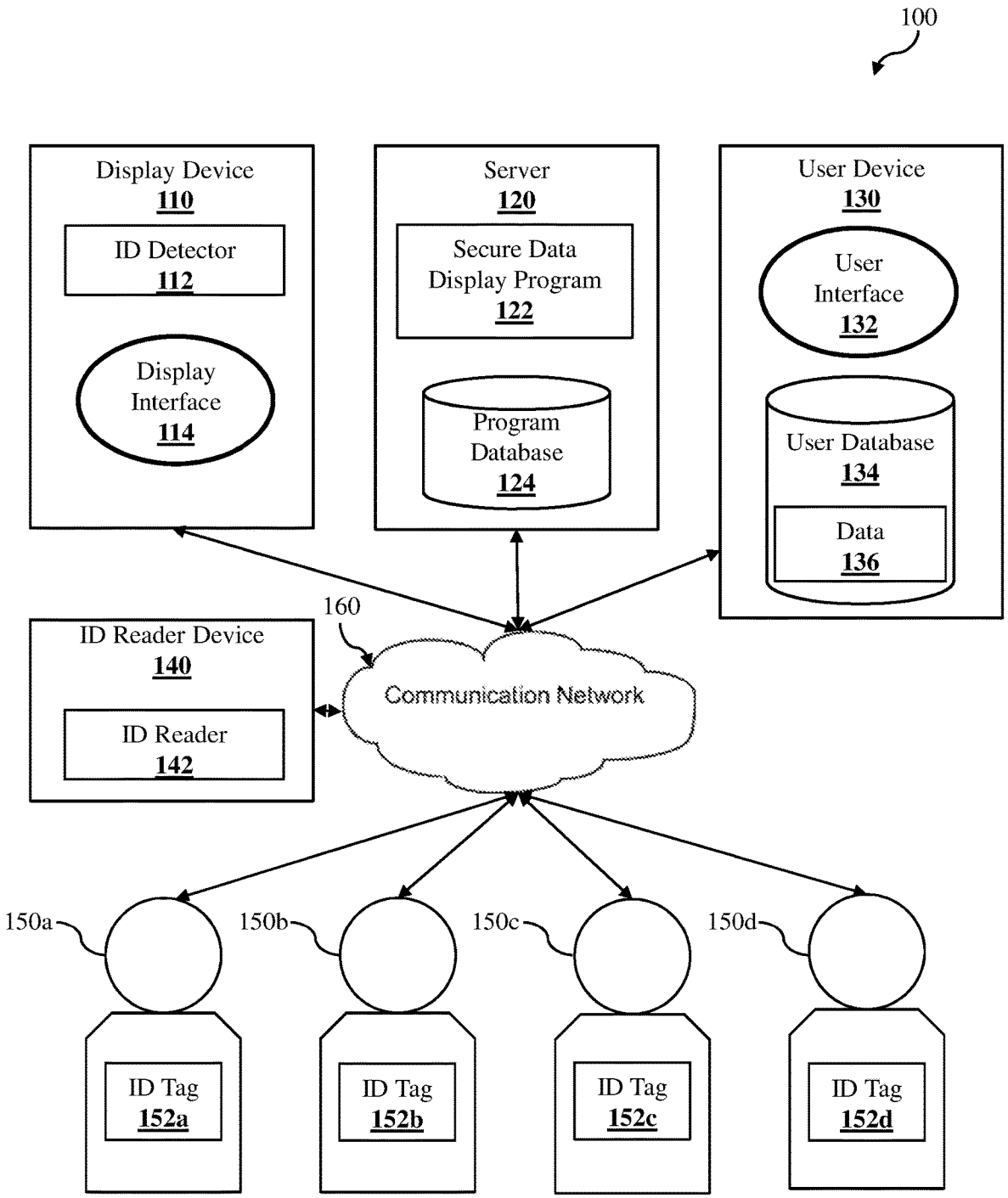
FIG. 1a illustrates a system for secure data display, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for securing data displayed on a shared display device. Current technology does not allow for the automatic redaction of sensitive or confidential data based on the physical presence of users with different security clearance. Current technologies only allow a user to preemptively redact sensitive or confidential data before presenting the data on a shared display device or by physically disconnecting the media containing the sensitive or confidential data from the shared display device. Thus, current technology does not allow for the automatic redaction of sensitive or confidential data based on the detected physical presence of a person who lacks the requisite security clearance to view the sensitive or confidential data. Embodiments of the present invention provide a means for automatically redacting or otherwise obscuring sensitive or confidential data based on the security level of the people physically present within a defined range of a shared display device.

Reference will now be made in detail to the embodiments of the present invention, examples of which are illustrated in the accompanying drawings, wherein like reference numerals refer to like elements throughout. Embodiments of the invention are generally directed to a system for predicting the motivational predisposition of an individual.

Users of whiteboards and other display devices may use the white boards and display devices to share sensitive or confidential data which may only be viewed by people with a requisite security clearance. Thus, the sensitive or confidential data must be protected from people who lack the sufficient security clearance to view the data displayed such as people who may wander into sight of the display devices without the proper security clearance. In order to protect sensitive and confidential information current systems and methods require a user to redact data before it is displayed on a display device or to physically remove the data from the display device, such as, by disconnecting media containing the data.

FIG. 1 illustrates a secure data display system 100, in accordance with an embodiment of the invention. In an example embodiment, the secure data display 100 includes a display device 110, a server 120, a user device 130, an identification (ID) reader device 140, and users 150a-c, interconnected via network 160.

In the example embodiment, the network 160 is the Internet, representing a worldwide collection of networks and gateways to support communications between devices connected to the Internet. The network 160 may include, for example, wired, wireless or fiber optic connections. In other embodiments, the network 160 may be implemented as an intranet, a local area network (LAN), or a wide area network (WAN). In general, the network 160 can be any combination of connections and protocols that will support communications between the display device 110, the server 120, the user device 130, the ID reader device 140, and the users 150a-d.

The display device 110 may include an identification (ID) detector 112 and a display interface 114. The display device 110 may be an interactive whiteboard, a television, a projector, a desktop computer, a notebook, a laptop computer, a tablet computer, a thin client, or any other electronic device or computing system capable of displaying or rendering audio, visual, or textual content and receiving and sending that content to and from other computing devices, such as the server 120, and the user device 130. When the display device 110 is an interactive whiteboard, it may be implemented using any known technology. The display device 110 may have one or more regions with each region associated with a distinct security level. For example, a white board may be divided into four quadrants with each quadrant being associated with a different security level and thus only viewable by a user with the requisite security clearance. The display device 110 is described in more detail with reference to FIG. 3.

The ID detector 112 may be any device capable of receiving a data signal and transmitting that data signal to the server 120 including. In an exemplary embodiment, the ID detector 112 may be a radio frequency identification (RFID) reader that may, in some embodiments, be using a cryptographic handshake protocol such as, but not limited to, Transport Layer Security (TLS) or Secure Sockets Layer (SSL). In other embodiments of the invention, the ID detector 112 may include one or more cameras or microphones and utilize other identification technologies, such as, but not limited to, gait detection technology, human motion recognition technology, silhouette recognition technology, speech recognition technology, facial recognition technology, etc. The cameras or microphones of the ID detector 112 may be integral with the display device or separate from the display device 110, e.g., disposed at various locations in or near an area or room from which information on the display device is visible, or in locations nearby to locations from which displayed information is visible, such as a hallway. The ID detector 112 may receive a data signal from any device capable of transmitting a data signal, such as, but not limited to, ID reader device 140, identification (ID) tags 152a-d associated with users 150a-d, which are described in more detail below, remote or integral cameras or microphones, and systems equipped with cameras or microphones having gait detection, human motion recognition, silhouette recognition, speech recognition, or facial recognition technology capabilities. In an exemplary embodiment of the invention, the ID detector 112 may receive a data signal from the ID tags 152a-d associated with the users 150a-d when they enter a pre-determined area surrounding the display device 110. In yet another embodiment of the invention, the display device 110 and ID detector 112 may be located in a secure room with access controlled by the ID reader device 140, which is described in more detail below.

The display interface 114 includes components used to receive input from a user on the user device 130 and the secure data display program 122 residing on the server 120 and display the input on the display device 110. In an example embodiment, the display interface 114 uses a combination of technologies and devices, such as device drivers, to provide a platform to enable the display device 110 to interact with the secure data display program 122 and the user device 130.

The server 120 may include secure data display program 122 and program database 124. In the example embodiment, the server 120 may be a desktop computer, a notebook, a laptop computer, a tablet computer, a thin client, or any other electronic device or computing system capable of storing compiling and organizing audio, visual, or textual content and receiving and sending that content to and from other computing devices, such as the display device 110, the user device 130, the ID reader device 140, and users 150a-d. The server 120 is described in more detail with reference to FIG. 3.

The secure data display program 122 is a program capable of receiving the data 136 from a first user on the user device 130 or via a physical input device, displaying the data 136 received from the user device 130 on the display device 110, receiving the security level of the users 150a-d and obscuring the some or all of the received data based on the received security level of the users 150a-d. For example, the secure data display program 122 may receive data, such as but not limited to, an audio, visual, or textual data, from the user 150a using the user device 130, or via a physical input device for inputting data directly onto the display device, to be displayed on the display device 110. The user 150a may use the secure data display program 122 to specify one or more security parameters required to view all of or portions of the data 136 to be displayed on the display device 110 via the display interface 114. The display device 110 will detect when another user or users, such as, but not limited to, the users 150b-d, enter a defined area around the display device 110 using the ID detector 112. The area may be a security parameter that is defined with respect to the display, and may be predefined or dynamically defined. The display device 110 will further detect the security level associated with the other user or users, such as, but not limited to, the users 150b-d and transmit that security level to the secure data display program 122. The secure data display program 122 will process the security level associated with all users detected by the display device 110 and redact, or otherwise obscure, the data based on the security parameters set by the user 150*a* to view the data 136. The secure data display program 122 is described in more detail below with reference to FIG. 1*b*.

The program database 124 may store the data 136 received from the user device 130. The program database 124 also contains a list of the users 150*a-d*, described in more detail below, who have access to the secure data display system. The program database 124 may also store the security clearance levels associated with the users 150*a-d* and any security parameters for the data 136 set by the one or more users 150*a-d*. For example, the program database may 124 contain a list of employees at a company along with their respective security clearances. The data 136 is described in more detail below.

The user device 130 may include a user interface 132, user database 134, and data 136. In the example embodiment, the user device 130 may be a desktop computer, a notebook, a laptop computer, a tablet computer, a thin client, or any other electronic device or computing system capable of storing compiling and organizing audio, visual, or textual data and receiving and sending that data to and from other computing devices, such as the server 120, and the display device 110 via the network 160. While only a single user device 130 is depicted, it can be appreciated that any number of user devices may be part of the secure data display system 100. In one embodiment, for example, there may be a user device 130 associated with each of the users 150*a-d*. In some embodiments, the user device 130 includes a collection of devices or data sources. The user device 130 is described in more detail with reference to FIG. 3.

The user interface 132 includes components used to receive input from a user, such as, but not limited to, the user 150*a*, on the user device 130 and transmit the input to the secure data display program 122 residing on server 120, or conversely to receive information from the secure data display program 122 and display the information to the user on user device 130. In an example embodiment, the user interface 132 uses a combination of technologies and devices, such as device drivers, to provide a platform to enable users of the user device 130 to interact with the secure data display program 122. In the example embodiment, the user interface 132 receives input, such as but not limited to, textual, visual, or audio input received from a physical input device, such as but not limited to, a keypad, mouse, and/or a microphone.

The user database 134 may store the data 136 on the user device 130. The data 136 may be any data, such as, but not limited to, audio, visual, or textual data, a user may want to display on the display device 110. The data 136 may be for example, but is not limited to, a Microsoft® Word file (.doc and .docx files), a Microsoft® PowerPoint® file (.ppt and .pptx files), a Microsoft® Excel® file (.xlx and .xlsx files), a PDF file (.pdf files), a Rich Text Format file (.rtf files), a plain text file (.txt files), etc. In another embodiment of the invention, the data 136 may be data that the user 150*a-d* inputs directly onto the display device 110. The user 150*a-d* may use a physical input device, for example, but not limited to, a digital pen or a user's finger to input data directly onto the display device 110.

The identification (ID) reader device 140 may include an identification (ID) reader 142. The ID reader device 140 may be any device capable of receiving a signal via the ID reader 142 from an identification tag 152*a-d* of the users 150*a-d* and transmitting that signal to the server 120. The ID reader device 140 may be for example, but is not limited to, a radio frequency identification (RFID) reader that, in some embodiments, is capable of using a cryptographic handshake protocol such as, but not limited to, Transport Layer Security (TLS) or Secure Sockets Layer (SSL). In an exemplary embodiment of the invention, the ID reader device 140 may control access to a secure room containing the display device 110.

The users 150*a-d* may be associated with identification (ID) tags 152*a-d*. The users 150*a-d* may by any person using or who has been granted access to data rendered on the display device 110, or a person not permitted access to data rendered on the display device 110. The ID tags 152*a-d* may be any identification device capable of transmitting a signal identifying the users 150*a-d* to the ID reader device 140 and the display device 110. The ID tags 152*a-d* may be for example, but not limited to, a radio frequency identification (RFID) tag. While users 150*a-d* and ID tags 152*a-d* are depicted, it can be appreciated that any number or users with associated ID tags may be a part of the secure data display system 100.

Figure 1B:
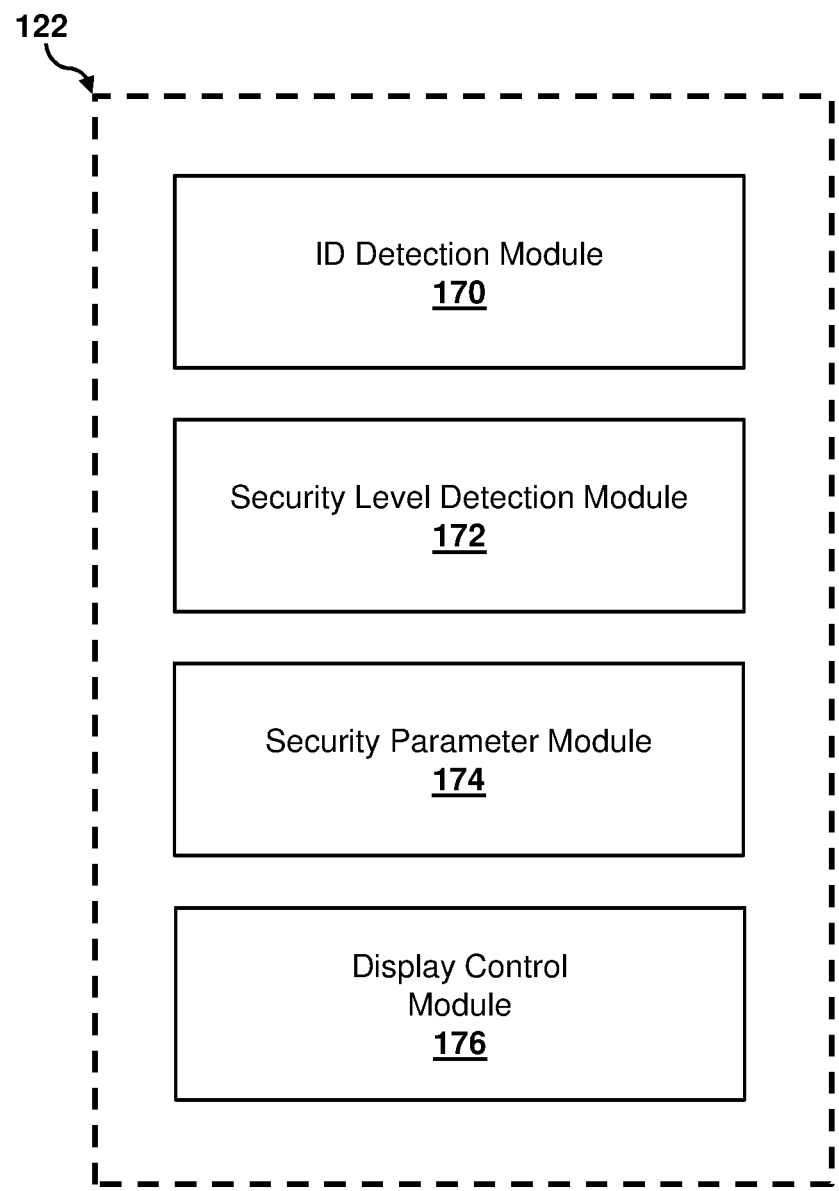

FIG. 1*b* illustrates example modules of the secure data display program 122. In an example embodiment, the secure data display program 122 may include four modules: identification (ID) detection module 170, security level detection module 172, security parameter module 174, and display control module 176.

The identification (ID) detection module 170 detects a data signal associated with the users 150*a-d* received by the ID detector 114 on the display device 110 or a data signal received from the ID reader device 140. In some embodiments, the identification (ID) detection module 170 detects a data signal associated with a user 150*a-d* or other person that originates with a remote or integral camera or microphone, or a system equipped with a camera or microphone which employs gait detection, human motion recognition, silhouette recognition, speech recognition, or facial recognition technology. The ID detection module 170 may detect a data signal within a defined range, such as, but not limited to, a room containing the display device 110 or within a certain radius around the display device 110. The ID detection module 170 may detect a data signal that includes identifying features of a person, such as an identifiable gait, motion, or silhouette, an identifiable voice, or an identifiable face. The ID detection module 170 may authenticate the data signal associated with the users 150*a-d* to the display device 110 by comparing the received data signal to a known data signal associated with the users 150*a-d* stored in the program database 124. For example, the user 150*a* may walk in front of the display device 110 and the ID detector 114 may receive a data signal from the ID tag 152*a* associated with the user 150*a*. The ID detector 114 may then transmit that signal to the server 120 and the secure data display program 122 using the ID detection module 170 will verify that the user 150*a* has access to the secure data display system 100. If the user 150*a* is listed in the program database 124 as having access to the secure data display system, the security level of the user 150*a* is then determined using the security level detection module 172. If the user 150*a* is not listed in the program database 124 as having access to the secure data display system 100, the secure data display program may obscure the display device 110 so that the unauthorized user cannot see the displayed data using the display control module 176.

The security level detection module 172 processes the one or more data signals from the ID tags 152*a-d* received by the server 120 and determines the security level associated with the one or more data signals. For example, a company may classify data, such as, but not limited to, highly confidential, confidential, and non-confidential, etc., and assign a security level required to access the different levels of classified data.

The security parameter module 174 controls access to the data 136 based on a set of security parameters. The security parameters may be set by a user associated with the data 136. In another embodiment of the invention, the display device 110 may have one or more regions, each region being associated with a different set of security parameters, which may be set by a user. For example, the display device 110 may have a menu which allows the user 150a-d to set the security parameters for each region of the display device 110. For example, the user 150a may want to share a file on the display device 110 to a group of people. The user 150a may set the security level required to view the file on the display device 110. The security parameters may be for example, but not limited to, a security level for viewing the data 136, a security level for editing the data 136. Further, the security parameters may include, but are not limited to, how the data 136 will be hidden when the secure data display system 100 detects the presence of a user without the requisite security level for viewing the data 136. Thus, the user 150a may, for example, but not limited to, set the secure data display program 122 to hide the entirety of the data 136 upon detection of a user without the requisite security level or if the data 136 contains data with more than one security level, the user 150a may set the secure data display program 122 to redact the portions of the data 136 which a detected user does not have the appropriate security level to view. In another embodiment of the invention, the user 150a may markup the data 136 while the data 136 is displayed on the user device 110. The user 150a may set security parameters for viewing the marked up data. For example, the user 150a may use a digital pen to markup the data 136 and the user 150a may assign a security level based on the color of the digital pen. A user may use one or more digital pens with different colors or a digital pen capable of switching between one or more different colors. The digital pen In yet another embodiment of the invention, the user 150 may create a new content directly on the display device 110. For example, the user 150a may write directly on the display device 110 with a digital pen and the user 150a may set security parameters based on the color of the digital pen.

The display control module 176 controls the display of the data 136 on the display device 110 based on the set security parameters and the security levels of the detected users. Thus, the display control module 176 may cause the data 136 displayed on the display device 110 to be hidden or redacted when the secure data display system 100 detects that one user without the requisite security level is present, even though other users with the requisite security level are present. For example, the user 150a may be giving a presentation, which has been designated as highly confidential, on the display device 110 and the secure data display system 100 may detect a user 150b who only has a security level allowing the user 150 to view data designated as confidential or lower. Therefore, the secure data display program 122 via the display control module 176 would cause the data 136 to be hidden from view on the display device 110. The precise mechanism used to hide or redact data or other information will depend on the technology underlying the display device 110, e.g., the particular technology used to implement an interactive whiteboard.

Figure 2:
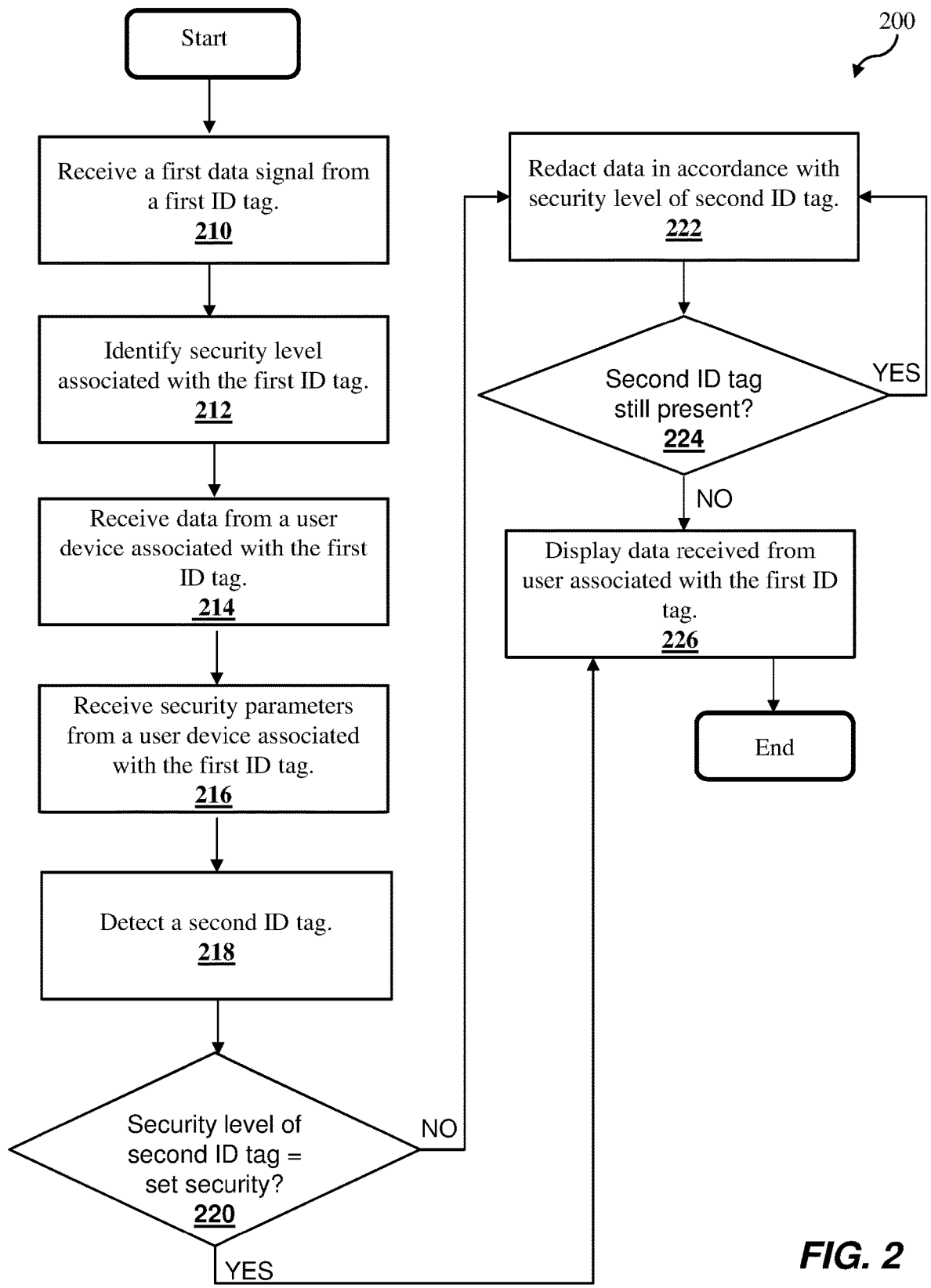
FIG. 2 is a flowchart illustrating an example method of the secure data display in accordance with an embodiment of the invention.

Referring to FIG. 2, a method 200 for secure data display is depicted, in accordance with an embodiment of the present invention.

Referring to block 210, the ID detection module 170 receives a first data signal from a first identification tag, e.g. the ID tag 152a, associated with a first user, e.g. the user 150a. Identification tag detection is described in more detail above with reference to the identification detection module 170.

Referring to block 212, the security level detection module 172 processes the data signal from the ID tag 152a and determines the security level associated with the ID tag 152a. Security level detection is described in more detail above with reference to the security level detection module 172.

Referring to block 214, the secure data display program 122 receives the data 136 for display on the display device 110. In one embodiment of the invention, the data 136 may be received from the user device 130. In another embodiment of the invention, the data 136 may be input directly onto the display device 110 using a physical input device, such as a digital pen or a user's finger.

Referring to block 216, the security parameter module 174 receives security parameters for access to the data 136 set by the user 150a-d. Security parameters for the data 136 is described in more detail above with reference to the security parameter module 174.

Referring to block 218, the ID detection module 170 receives a second data signal from a second identification tag, e.g. the ID tag 152b, associated with a second user, e.g. the user 150b. Identification tag detection is described in more detail above with reference to the identification detection module 170.

Referring to block 220, the security level detection module 172 processes the data signal from the second identification tag, e.g. the ID tag 152b, and determines if security level associated with the ID tag 152b meets the security parameters set by the first user, e.g. the user 150a. If the security level detection module 172 determines that the security level associated with the second identification tag, e.g. the ID tag 152b, meets the security parameters, the secure data display program 122 proceeds to block 226. If the security level detection module 172 determines that the security level associated with the second identification tag, e.g. the ID tag 152b, does not meet the security parameters, the secure data display program 122 proceeds to block 222. Security level comparison is described in more detail above with reference to the security level detection module 172.

Referring to block 222, the display control module 176 redacts the display of the data 136 on the display device 110 based on the set security parameters and the security levels of the detected users. For example, the display control module 176 would redact all data 136 on the display device 110 that the user 150b does not have the security clearance to view. Display control is described in more detail above with reference to the display control module 176.

Referring to block 224, the secure data display program 122 determines the security level of all users present within an area defined for the secure data display system 100. If the secure data display program 122 detects that the second user, e.g. the user 150b, is still present, the secure data display program 122 proceeds to block 222, where rendered data is redacted. If the secure data display program 122 detects that the second user, e.g. the user 150b, is no longer present and all present users meet the requisite security parameters to view the data 136, the secure data display program 122 proceeds to block 226, where data is displayed.

Referring to block 226, the display control module 176 causes data to be displayed, i.e., the data 136 received from the first user, e.g. the user 150a, associated with the first identification tag, e.g. the ID tag 152a, on the display device 110.

Figure 3:
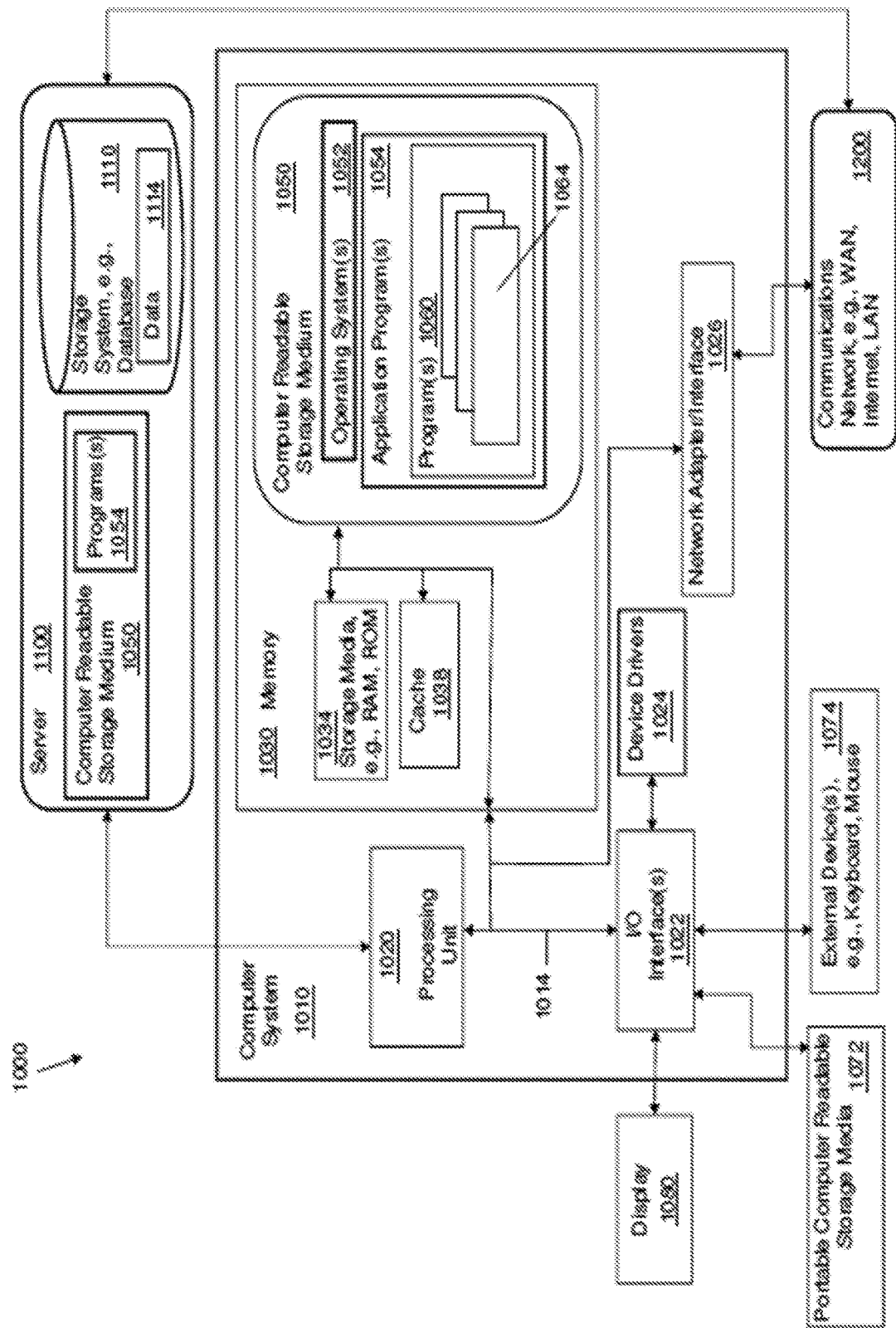
FIG. 3 is a block diagram depicting the hardware components of the secure data display system of FIG. 1, in accordance with an embodiment of the invention.
Figure 4:
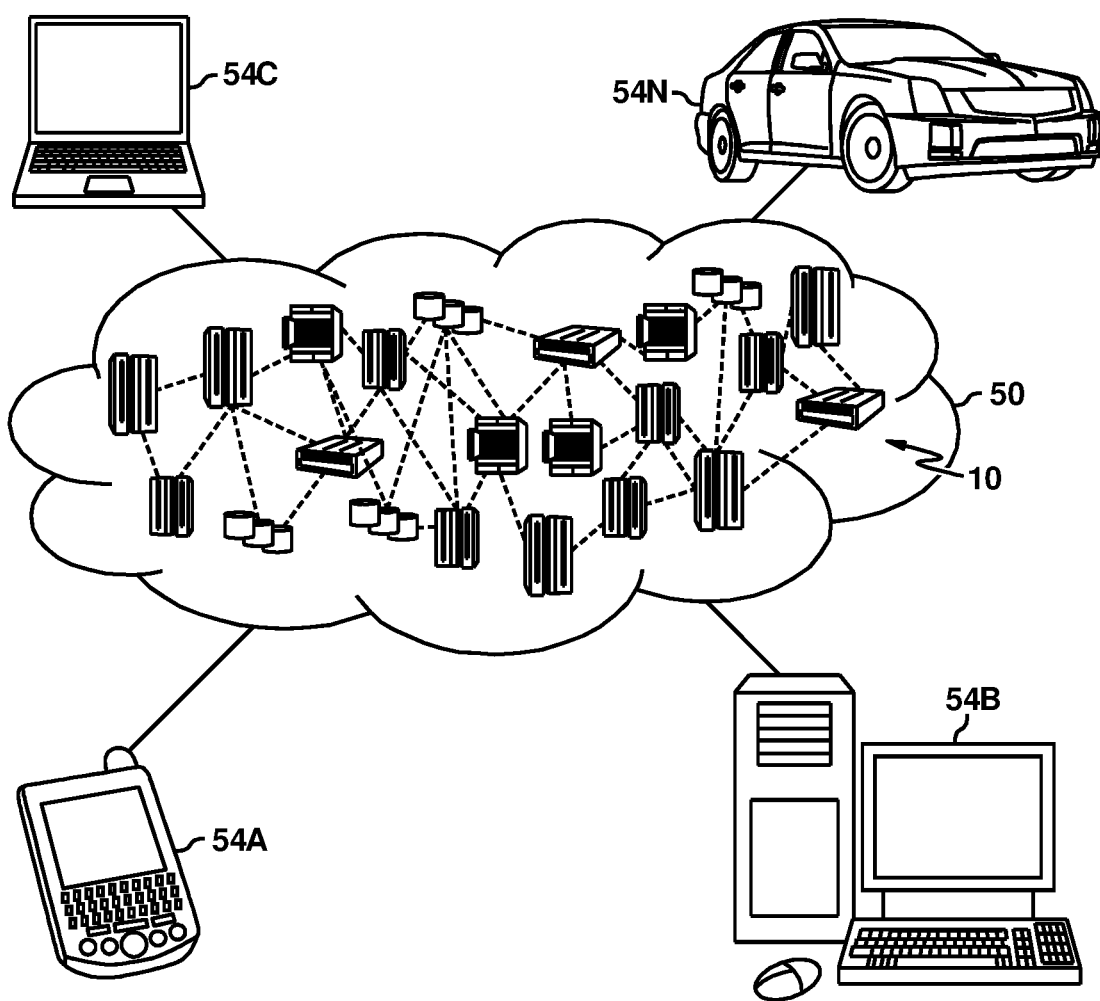
FIG. 4 illustrates a cloud computing environment, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
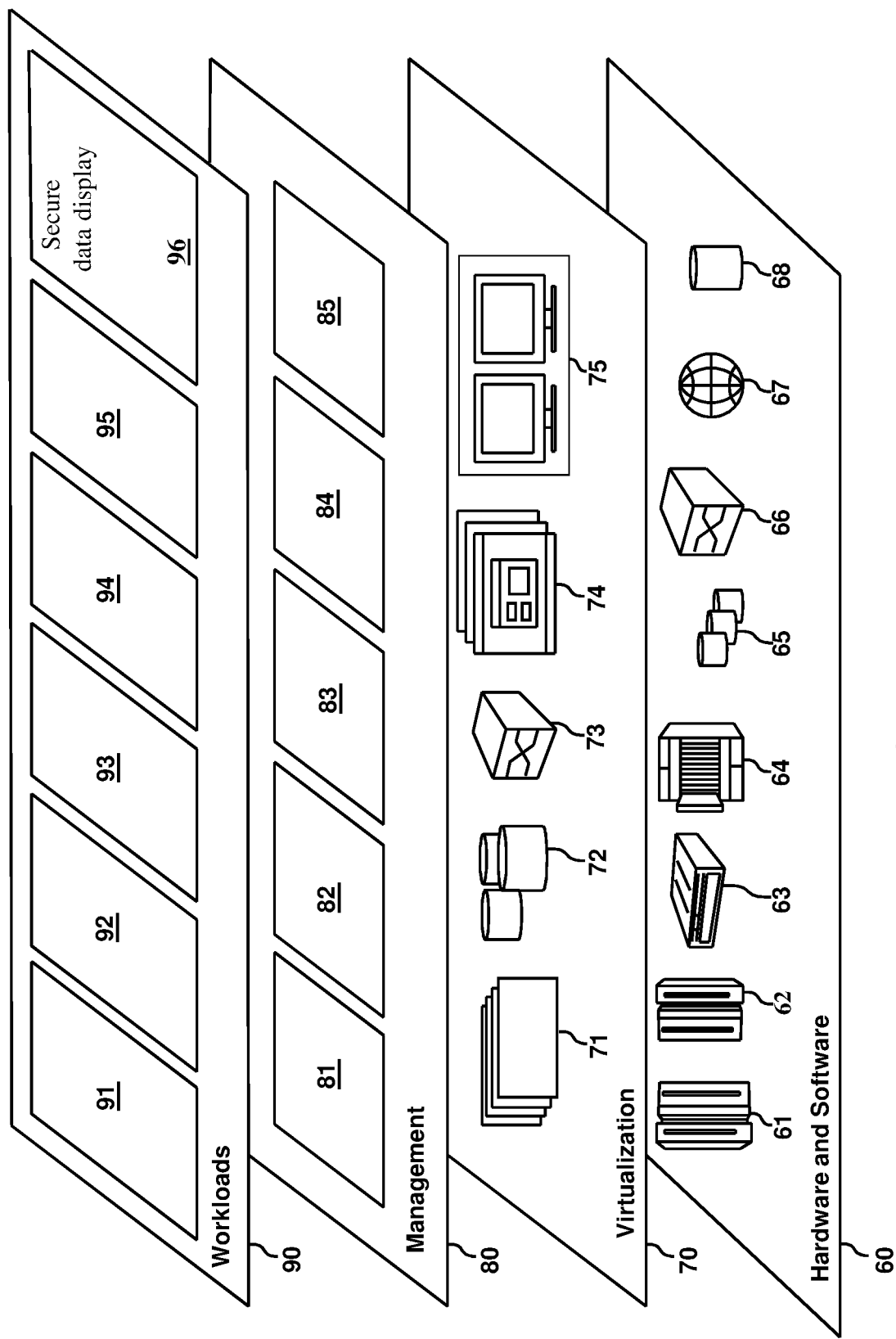
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure data display 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer program product for securing data on a display device, the computer program product comprising:
   a computer-readable storage medium having program instructions embodied therewith, wherein the computer readable storage medium is not a transitory signal per se, the program instructions comprising:
   program instructions to detect a first user within a defined area of a display device, the first user having a first security level, wherein the display device has one or more regions, each of the one or more regions being associated with a security level, and wherein the first user sets the security parameters associated with the one or more regions of the display device;
   program instructions to display data on the display device, the data being associated with a security parameter defining a security level for viewing the data;
   program instructions to detect a second user within the defined area of the display device, the second user having a second security level;
   program instructions to determine that the second security level of the second user does not meet the security parameter for viewing the data; and
   program instructions to redact the data in response to determining that the second user does not meet the security parameter for viewing the data.

2. A computer program product as in claim 1, wherein the program instructions further comprise:
   program instructions to detect that the second user is no longer within the defined area of the display device; and
   program instructions to display the data in response to detecting that the second user is outside the defined area of a display device.

3. A computer program product as in claim 1, wherein the program instructions to detect a first user and a second user within the defined area of a display device further comprise:
   program instructions to receive a first radio frequency identification (RFID) signal from a first RFID device associated with the first user; and
   program instructions to receive a second (RFID) signal from a second RFID device associated with the second user.

4. A computer program product as in claim 1, wherein the data is placed on the display device using a digital pen, the digital pen capable of switching between one or more colors, each color being associated with different security level.

5. A computer program product as in claim 1, wherein the first and second users are detected using one of the group consisting of: gait recognition technology, human motion recognition technology, silhouette recognition technology, facial recognition technology, or speech recognition technology.

6. A computer system for securing data on a display device, the system comprising:
   one or more computer processors, one or more computer-readable storage media, and program instructions stored on one or more of the computer-readable storage media for execution by at least one of the one or more processors, the program instructions comprising:
   program instructions to detect a first user within a defined area of a display device, the first user having a first security level, wherein the display device has one or more regions, each of the one or more regions being associated with a security level, and wherein the first user sets the security parameters associated with the one or more regions of the display device;
   program instructions to display data on the display device, the data being associated with a security parameter defining a security level for viewing the data;
   program instructions to detect a second user within the defined area of the display device, the second user having a second security level;
   program instructions to determine that the second security level of the second user does not meet the security parameter for viewing the data; and
   program instructions to redact the data in response to determining that the second user does not meet the security parameter for viewing the data.

7. A computer system as in claim 6, wherein the program instructions further comprise:
   program instructions to detect that the second user is no longer within the defined area of the display device; and
   program instructions to display the data in response to detecting that the second user is outside the defined area of a display device.

8. A computer system as in claim 6, wherein the program instructions to detect a first user and a second user within the defined area of a display device further comprise:
   program instructions to receive a first radio frequency identification (RFID) signal from a first RFID device associated with the first user; and
   program instructions to receive a second (RFID) signal from a second RFID device associated with the second user.

9. A computer system as in claim 6, wherein the data is placed on the display device using a digital pen, the digital pen capable of switching between one or more colors, each color being associated with different security level.

10. A computer system as in claim 6, wherein the first and second users are detected using one of the group consisting of: gait recognition technology, human motion recognition technology, silhouette recognition technology, facial recognition technology, or speech recognition technology.

* * * * *